United States Patent [19]
Mirosevic

[11] Patent Number: 5,689,944
[45] Date of Patent: Nov. 25, 1997

[54] WEEDER AND MULCHER APPARATUS

[76] Inventor: Ivan Mirosevic, P.O. Box 298, Elcajon, Calif. 92022

[21] Appl. No.: 556,165

[22] Filed: Nov. 9, 1995

[51] Int. Cl.⁶ .................................................. A01D 19/00
[52] U.S. Cl. ............................ 56/16.8; 56/11.9; 239/172
[58] Field of Search ................................ 56/16.6, 16.8, 56/13.5, 10.4, 11.9, 327.1, 328.1; 239/172, 142, 164; 111/127, 118, 119, 120; 172/4.5

[56] References Cited

U.S. PATENT DOCUMENTS

| | | | |
|---|---|---|---|
| 2,930,334 | 3/1960 | Marron et al. | 111/127 |
| 3,252,249 | 5/1966 | Propst | 111/127 X |
| 3,330,070 | 7/1967 | Ferm et al. | 111/127 X |
| 3,779,461 | 12/1973 | Paul | 239/172 |
| 3,930,324 | 1/1976 | Wightman et al. | 37/189 |
| 4,034,686 | 7/1977 | Collins | 111/7 |
| 4,300,461 | 11/1981 | Hodge et al. | 111/6 |
| 4,481,894 | 11/1984 | Brenn | 111/127 |
| 4,662,163 | 5/1987 | Adams | 56/16.8 X |
| 4,807,544 | 2/1989 | Cross et al. | 111/7 |
| 4,936,031 | 6/1990 | Briggs et al. | 37/80 R |
| 5,007,803 | 4/1991 | Divito et al. | 417/137 |
| 5,016,717 | 5/1991 | Simons et al. | 175/66 |
| 5,101,745 | 4/1992 | Podevels et al. | 111/127 |
| 5,201,638 | 4/1993 | Bieri | 417/234 |
| 5,295,317 | 3/1994 | Perrott | 37/348 |
| 5,394,812 | 3/1995 | Dunning et al. | 111/127 |
| 5,460,106 | 10/1995 | Crockett et al. | 111/127 |
| 5,487,346 | 1/1996 | Taylor | 111/127 |
| 5,503,091 | 4/1996 | Foster et al. | 111/127 |

*Primary Examiner*—Terry Lee Melius
*Assistant Examiner*—Victor Batson

[57] ABSTRACT

A weeder and mulcher apparatus including an engine that has a fuel tank and is capable of generating electrical energy. Included is a trailer that has a front end with a trailer hitch and a trailer body supported above the ground. Also, included is a tank that has a tank top, a pair of fluid lines and an amount of fluid therein. The tank is mounted on a top surface of the trailer. Additionally, an air compressor that has a housing unit and a pair of lines is included. The compressor has a pair of legs that support the compressor on the top surface of the trailer. The compressor is powered by the energy produced by the engine. Lastly, a pair of pumps are included. Each pump has a top end for receiving one of the pair of air lines of the compressor. Each pump has a bottom end for receiving one of the pair of fluid lines of the tank. Each pump pressurizes the fluid of the tank and transports the pressurized fluid through a plurality of fluid jets.

1 Claim, 3 Drawing Sheets

WEEDER AND MULCHER APPARATUS

BACKGROUND OF THE INVENTION

1. Field of the Invention

The present invention relates to a weeder and mulcher apparatus and more particularly pertains to allowing weeds in an orchard, vineyard, or on farm land to be cut and turned into mulch by pressurized water that is sprayed from a pair of high pressure pumps positioned on top of a trailer that is pulled by a tractor.

2. Description of the Prior Art

The use of chemical weeding is known in the prior art. More specifically, chemical weeding heretofore devised and utilized for the purpose of weed removal are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,295,317 to Perrott discloses an apparatus for excavating earthen material by evacuation of same. U.S. Pat. No. 5,201,638 to Bieri discloses a hydraulic energy supply cart. U.S. Pat. No. 5,016,717 to Simmons, Turner, and Brell discloses a vacuum excavator. U.S. Pat. No. 4,936,031 to Briggs and Nathenson discloses an apparatus for excavating soil and the like using supersonic jets. U.S. Pat. No. 4,018,483 to Smith discloses a process and apparatus for dislodging and conveying material from a surface with a positive pressure fluid stream. Lastly, U.S. Pat. No. 3,930,324 to Wightman, Ward, and Miller discloses a mechanical excavating machine including rotary cutter and suction tube.

While these devices fulfill their respective, particular objectives and requirements, the aforementioned patents do not describe weeder and mulcher apparatus that allows weeds cut by the pressurized water that projects from the fluid jets of the first pump at the bottom of the trailer to be pulped into the soil by the fluid from the second pump as the apparatus is pulled by the tractor through the field.

In this respect, the weeder and mulcher apparatus according to the present invention substantially departs from the conventional concepts and designs of the prior art, and in doing so provides an apparatus primarily developed for the purpose of allowing weeds in an orchard, vineyard, or on farm land to be cut and turned into mulch by pressurized water that is sprayed from a pair of high pressure pumps positioned on top of a trailer that is pulled by a tractor.

Therefore, it can be appreciated that there exists a continuing need for a new and improved weeder and mulcher apparatus which can be used for allowing weeds in an orchard, vineyard, or on farm land to be cut and turned into mulch by pressurized water that is sprayed from a pair of high pressure pumps positioned on top of a trailer that is pulled by a tractor. In this regard, the present invention substantially fulfills this need.

SUMMARY OF THE INVENTION

In view of the foregoing disadvantages inherent in the known types of chemical weeding now present in the prior art, the present invention provides an improved weeder and mulcher apparatus. As such, the general purpose of the present invention, which will be described subsequently in greater detail, is to provide a new and improved weeder and mulcher apparatus and method which has all the advantages of the prior art and none of the disadvantages.

To attain this, the present invention essentially comprises a combustion engine that has a generally rectangular fuel tank positioned thereon. The engine has an exhaust pipe that extends therefrom. The engine generates electrical energy. Also, included is a generally rectangular trailer that has a front end, a rear end, and a trailer body therebetween. The front end of the trailer has a trailer hitch extending therefrom. The trailer body is supported above the ground by a pair of front wheels and a pair of rear wheels. Each wheel pair of coupled to an axle that is attached to a bottom surface of the trailer. The trailer is moved by coupling the trailer hitch to a tractor for pulling the trailer. Included is a generally rectangular tank. The tank has a tank top and a pair of fluid lines that extend therefrom. The tank is mounted on a top surface of the trailer and adjacent the rear end. The tank contains an amount of fluid. The tank top provides a pressure seal for the tank with the fluid therein. Additionally, an air compressor that has a housing unit and a compression tank is included. The air compressor is supported by a pair of legs. The air compressor is centrally mounted onto the top surface of the body of the trailer. The housing unit has a front side and a back side. The front side has a front air line extending therefrom. The back side has a back air line extending therefrom. The compressor is powered by the energy produced by the engine. Lastly, a pair of high pressure pumps are included. Each pump has a top end and a bottom end. The pair of pumps form a first pump and a second pump. The first pump is positioned between the air compressor and the engine on the top surface of the trailer. The second pump is positioned between the air compressor and the tank on the top surface of the trailer. The first pump receives pressurized air through the front air line of the air compressor near the top end of the first pump. The second pump receives pressurized air through the back air line of the air compressor near the top end of the second pump. Furthermore, each pump receives fluid through one of the pair of fluid lines of the tank near the bottom end of each pump. Each pump is an air driven pump that is capable of placing the fluid received from the tank under pressure. Placing the fluid under pressure allows it to generate a fluid pressure between about three thousand to twenty thousand pounds per square inch. Each pump has extending therefrom a pressure pipe for transporting fluid that is placed under pressure by one of the pumps. Each pressure pipe extends beyond the bottom surface of the trailer. Each pressure pipe has a plurality of fluid jets that extend therefrom. Each fluid jet has a fluid projection end for projecting the pressurized fluid toward the ground at a trajectory of about sixty degrees. This trajectory allows the pressurized fluid to cut weeds and then mulch the weeds when the trailer is pulled by the tractor.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved weeder and mulcher apparatus which has all of the advantages of the prior art chemical weeding and none of the disadvantages.

It is another object of the present invention to provide a new and improved weeder and mulcher apparatus which may be easily and efficiently manufactured and marketed.

It is further object of the present invention to provide a new and improved weeder and mulcher apparatus which is of durable and reliable constructions.

An even further object of the present invention is to provide a new and improved weeder and mulcher apparatus which is susceptible of a low cost of manufacture with regard to both materials and labor, and which accordingly is then susceptible of low prices of sale to the consuming public, thereby making such weeder and mulcher apparatus economically available to the buying public.

Still yet another object of the present invention is to provide a new and improved weeder and mulcher apparatus which provides in the apparatuses and methods of the prior art some of the advantages thereof, while simultaneously overcoming some of the disadvantages normally associated therewith.

Even still another object of the present invention is to provide a weeder and mulcher apparatus for allowing weeds in an orchard, vineyard, or on farm land to be cut and turned into mulch by pressurized water that is sprayed from a pair of high pressure pumps positioned on top of a trailer that is pulled by a tractor.

Lastly, it is an object of the present invention to provide a new and improved weeder and mulcher apparatus including an engine that has a fuel tank and is capable of generating electrical energy. Included is a trailer that has a front end with a trailer hitch extending therefrom and a trailer body supported above the ground. Also, a tank is included. The tank has a tank top, a pair of fluid lines that extend therefrom, and an amount of fluid therein. The tank is mounted on a top surface of the trailer. Additionally, an air compressor that has a housing unit and a pair of lines are included. The compressor has a pair of legs that support the compressor on the top surface of the trailer. The compressor is powered by the energy produced by the engine. Lastly, a pair of pumps are included. Each pump has a top end for receiving one of the pair of air lines of the compressor. Each pump has a bottom end for receiving one of the pair of fluid lines of the tank. Each pump is capable of pressurizing the fluid of the tank and transporting the pressurized fluid through a pressure pipe of each pump. Each pressure pipe has a plurality of fluid jets for projecting the pressurized fluid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
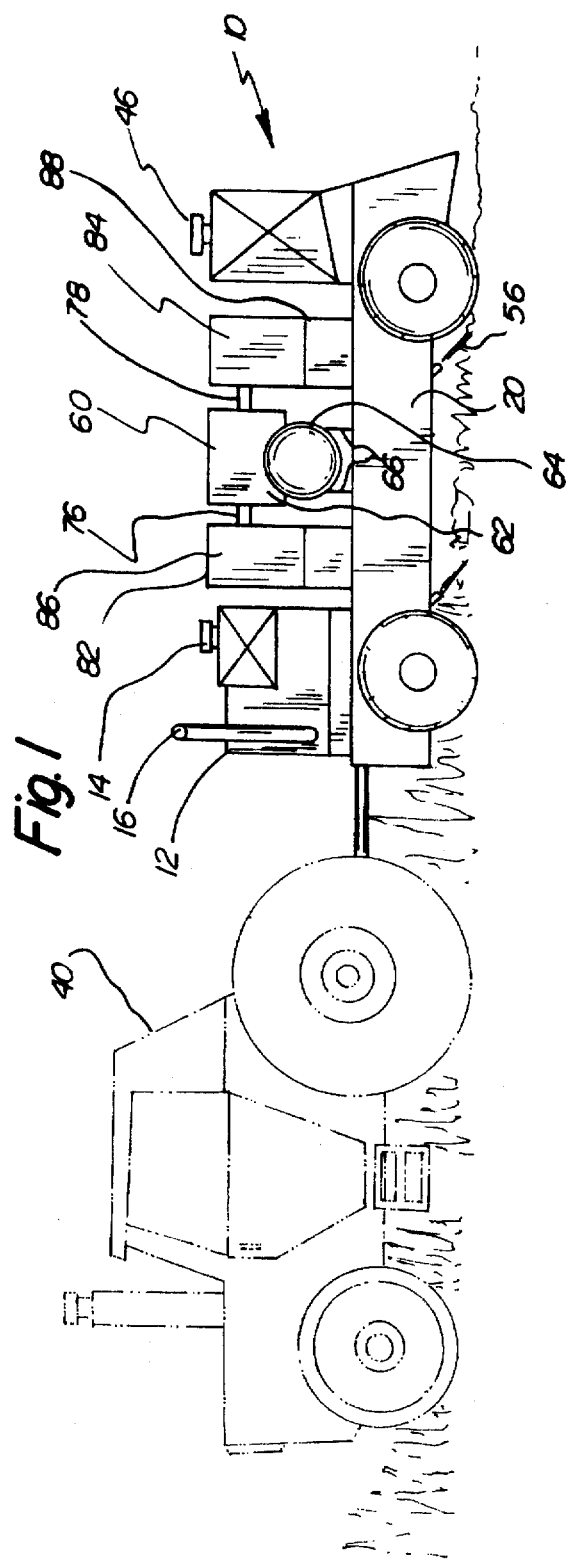
FIG. 1 is a perspective view of the preferred embodiment of the weeder and mulcher apparatus constructed in accordance with the principles of the present invention.

With reference now to the drawings, and in particular to FIG. 1 thereof, the preferred embodiment of the new and improved weeder and mulcher apparatus embodying the principles and concepts of the present invention and generally designated by the reference numeral 10 will be described.

The present invention, the weeder and mulcher apparatus 10 is comprised of a plurality of components. Such components in their broadest context include a engine, a trailer, a tank, an air compressor, and a pair of pumps. Such components are individually configured and correlated with respect to each other so as to attain the desired objective.

Figure 2:
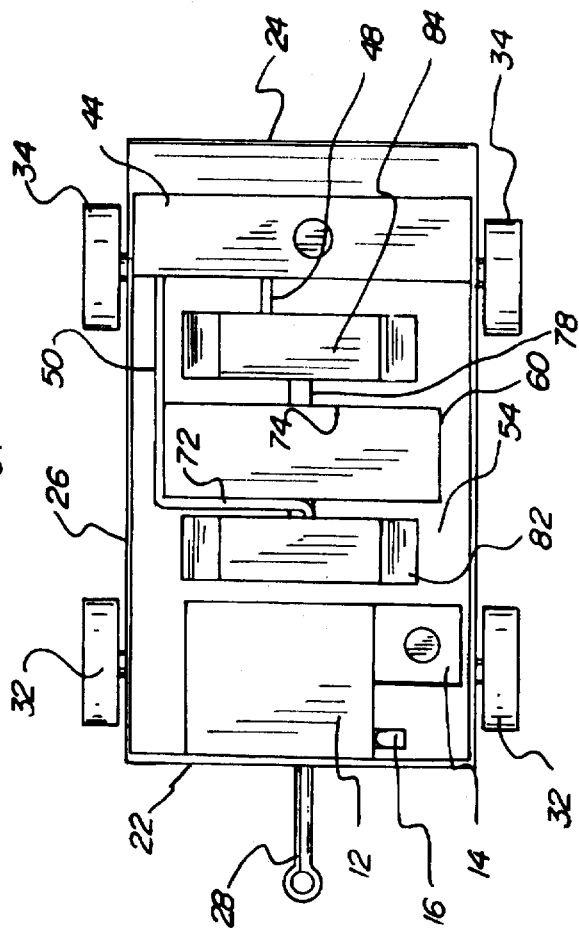
FIG. 2 is a top plan view of the present invention in an operable configuration.
Figure 3:
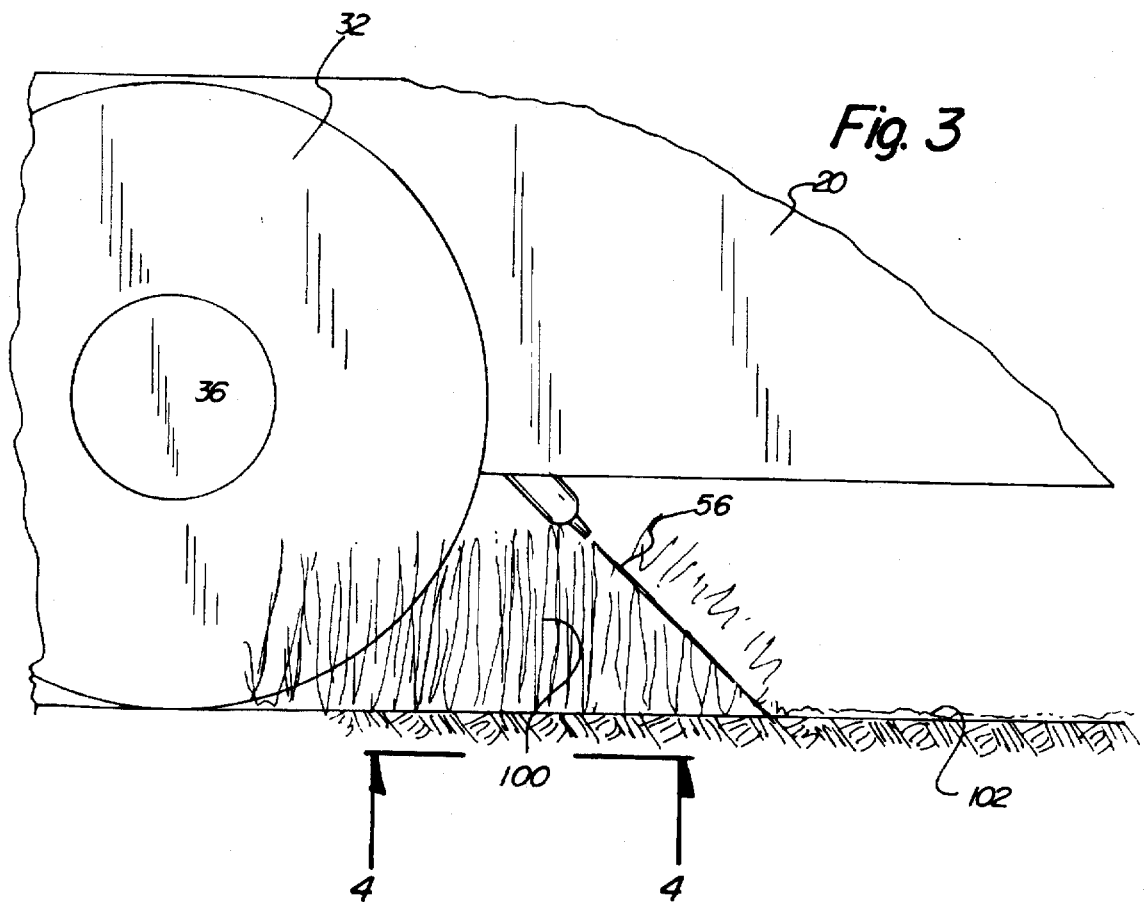
FIG. 3 is an enlarged view of a fluid jet of the present invention in an operable configuration.
Figure 4:
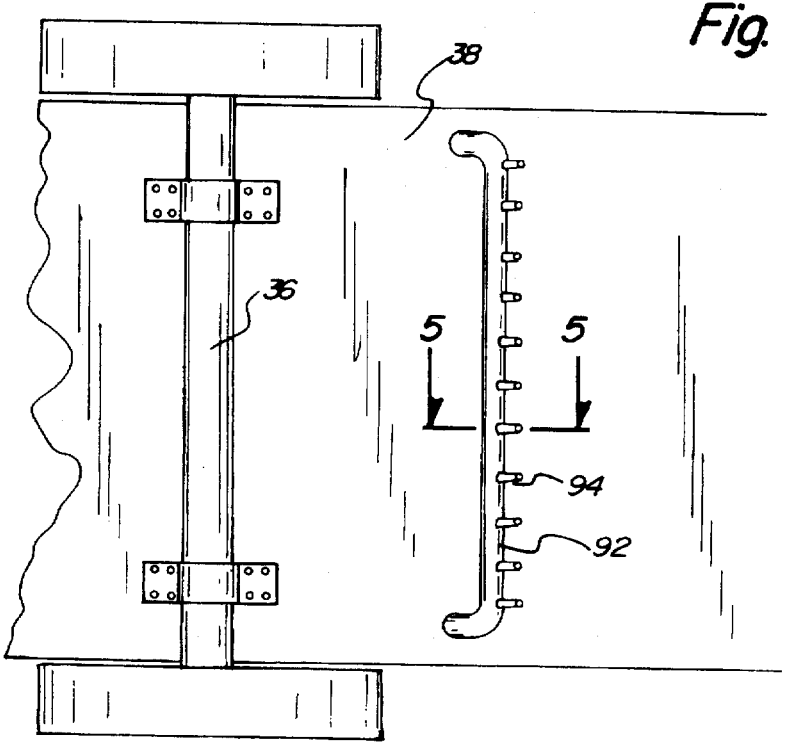
FIG. 4 is a cut-away bottom view of the present invention of FIG. 1.

Specifically, the present invention includes a combustion engine 12 that has a generally rectangular fuel tank 14. The fuel tank is positioned on the engine. The engine has an exhaust pipe 16 that extends from one side of the engine. The engine is capable of generating electrical energy. The engine, as shown in FIG. 1, may be fueled by gasoline or diesel fuel. Also, included is a generally rectangular trailer 20. The trailer, as shown in FIG. 2, has a front end 22, a rear end 24, and a trailer body 26. The front end of the trailer has a trailer hitch 28 that extends outwardly therefrom. The trailer and trailer hitch are formed of a metal or metal alloy. The trailer body is supported above the ground by a pair of front wheels 32 and a pair of rear wheels 34. Each wheel pair is coupled to an axle 36 that is attached to a bottom surface 38 of the trailer, as shown in FIG. 4. The trailer may be moved by coupling the trailer hitch to a tractor 40 for pulling the trailer. The trailer may be pulled through an orchard, vineyard, or farm land by any powered vehicle.

As best illustrated in FIG. 2, a generally rectangular tank 44 is provided. The tank has a tank top 46 and a pair of fluid lines 48 and 50 that extend therefrom. The tank is mounted on a top surface 54 of the trailer and adjacent the rear end 24. The tank is for containing an amount of fluid 56 therein. The tank top is capable of sealing the fluid within the tank. The sealing of the tank ensures a continuous flow of the fluid into the fluid lines. The tank may be formed of any rigid plastic. The tank is opaque so that the user of the apparatus can keep a constant watch on the fluid level. The fluid used in the tank is preferably water. But, the fluid may be mixed with any other non-corrosive substance that is water-like or is water soluble.

Additionally, an air compressor 60 is included. The compressor has a housing unit 62 and a compression tank 64 that is supported by a pair of legs 66. The air compressor is a standard compressor commercially available. The compressor provides one hundred pounds per square inch of working air. The air compressor, as shown in FIG. 1, is centrally mounted onto the top surface 54 of the body 26 of the trailer 20. The housing unit has a front side 72 and a back side 74. The front side has a front air line 76 extending therefrom and in receipt of the working air. The back side has a back air line 78 extending therefrom and in receipt of working air. The compressor is in electrical communication with the engine and is powered by the energy generated by the engine 12.

Lastly, as illustrated in FIG. 1, a pair of high pressure pumps 82 and 84 are provided. Each pump has a top end 86 and a bottom end 88. The pair of pumps form a first pump 82 and a second pump 84. The first pump is positioned between the air compressor 60 and the engine 12 on the top surface 54 of the trailer. The second pump is positioned between the air compressor and the tank 44 on the top surface of the trailer 20. The first pump receives pressurized air through the front air line 76 of the air compressor near the top end. The second pump receives pressurized air through the back air line 78 of the air compressor near the top end.

Furthermore, each pump is capable of receiving fluid through one of the pair of fluid lines 48 and 50 of the tank near the bottom end of each pump. Each pump is an air driven pump that is capable of placing the fluid of the tank under pressure. The pressurized fluid generated by the pump provides a fluid pressure between about three thousand to twenty thousand pounds per square inch. Each high pressure pump is preferably one chosen from the commercially available Teledyne Sprague engineering. Specific models of Teledyne pumps are capable of putting out liquid output pressures greater than three thousand pounds per square inch utilizing one hundred pounds per square inch of working air.

Figure 5:
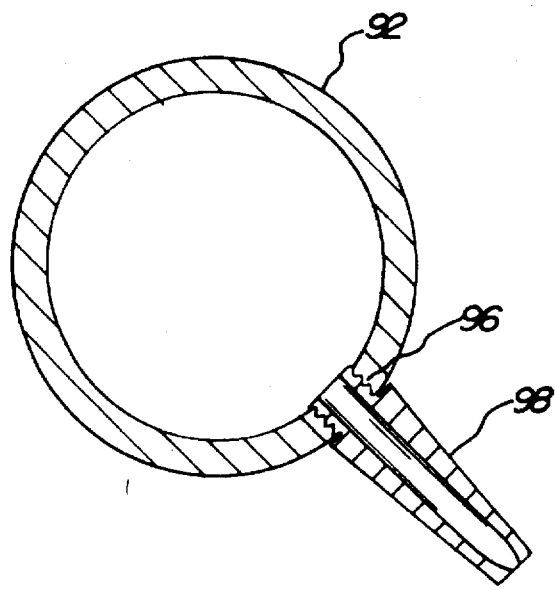
FIG. 5 is a sectional view of the present invention taken along line 5—5 of FIG. 4.
Figure 6:
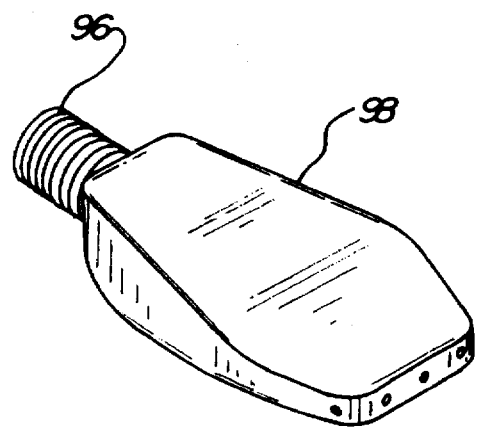
FIG. 6 is an alternative embodiment of the fluid jet of the present invention.

Each pump, as shown in FIG. 4, has a pressure pipe 92 extending therefrom. The pressure pipes of the pumps transport fluid that has been placed under pressure by one of the pumps. Each pressure pipe extends beyond the bottom surface 38 of the trailer 20. Each pressure pipe has a plurality of fluid jets 94 that extend therefrom. Each fluid jet has a threaded end 96 for coupling with the pressure pipes. Each fluid jet has a fluid projecting end 98 for projecting the pressurized fluid toward the ground at a trajectory of about sixty degrees with respect to the ground for weed cutting and mulching when the trailer is pulled by the tractor. The plurality of fluid jets expel the pressurized fluid in a jet stream at the trajectory of about sixty degrees to allow weeds to be cut and mulched into the soil for use as organic humus. The weeds 100, as shown in FIG. 1, are pulped and remain as mulch 102 along the ground. The fluid projection end of the fluid jets may be tapered as shown in FIG. 5. The fluid projection end of the plurality of fluid jets may be in the shape of a thumb screw, as shown in FIG. 6. Both structures for the fluid projection end of the fluid jets will provide the trajectory needed to cut and pulp the weeds in any soil consistency.

The present invention is a weeder and mulcher apparatus that is unique and provides a method for non-toxic weed control that is designed for commercial farming operations. The apparatus employs two series of high pressure pumps that are attached to pressurized piping with fluid jets projecting from the bottom thereof. The high pressure pumps allow water to be projected through the fluid jets at about three thousand to about twenty thousand p.s.i. to cut the weeds and then pulp the weeds into the soil. The present invention is positioned on a trailer to be pulled by a tractor or any vehicle that is used in commercial fields. The present invention may be structured to have self-propelling capabilities. With the present invention a fabricated compact steel trailer is used with the apparatus. The engine is a gas or diesel driven engine, which provides the power for the air compressor. The air compressor provides pressurized air of one hundreds p.s.i. that will facilitate the operation of both of the high pressure pumps. It should be noted that the present invention is operational for weed cutting when a single high pressure pump is used.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A weeder and mulcher apparatus for use in an orchard, a vineyard and farmland comprising in combination:

a combustion engine having a generally rectangular fuel tank positioned thereon and an exhaust pipe extending therefrom, the engine being capable of generating electrical energy;

a generally rectangular trailer having a front end, a rear end and a trailer body therebetween, the front end of the trailer having a trailer hitch extending therefrom, the trailer body being supported above the ground by a pair of front wheels and a pair of rear wheels, each wheel pair being coupled to an axle attached to a bottom surface of the trailer, the trailer capable of being moved by coupling the trailer hitch to a tractor for pulling of the trailer;

a generally rectangular tank having a tank top and a pair of fluid lines extending therefrom, the tank being mounted on a top surface of the trailer adjacent the rear end, the tank being capable of containing an amount of fluid therein, the tank top being capable of sealing the fluid within the tank for allowing a continuous flow of the fluid into the fluid lines, the tank being opaque to allow monitoring of the fluid level therein;

an air compressor having a housing unit and a compression tank being supported by a pair of legs, the air compressor being centrally mounted onto the top surface of the body of the trailer and providing one hundreds pounds per square inch of working air, the housing unit having a front side and a back side, the front side having a front air line extending therefrom, the back side having a back air line extending therefrom, the compressor being powered by the electrical energy generated by the engine;

a pair of high pressure pumps having a top end and a bottom end, the pair of pumps forming a first pump and a second pump, the first pump being positioned between the air compressor and the engine on the top surface of the trailer, the second pump being positioned between the air compressor and the tank on the top surface of the trailer, the first pump capable of receiving pressurized air through the front air line of the air compressor near the top end, the second pump capable of receiving pressurized air through the back air line of the air compressor near the top end;

each pump being capable of receiving fluid through one of the pair of fluid lines of the tank near the bottom end of each pump, each pump being an air driven pump capable of placing the fluid of the tank under pressure for generating a fluid pressures between about 3000 to 20,000 pounds per square inch, each pump having extending therefrom a pressure pipe for transporting fluid being placed under pressure by one of the pumps, each pressure pipe extending beyond the bottom surface of the trailer; and a plurality of fluid jets having a threaded end and a fluid projecting end, the threaded end being coupled with the pressure pipes, each fluid jet being projected downwardly at an angle from the bottom surface of the trailer for projecting the pressurized fluid towards the ground at a trajectory of about sixty degrees with respect to the ground, the plurality of fluid jets by expelling the pressurized fluid in a et stream at the trajectory of about sixty degrees allows weeds to be cut and mulched into soil of any consistency for use as organic humus as the trailer is pulled by the tractor.

* * * * *